Jan. 7, 1941.      R. G. DREW      2,227,444
ADHESIVE SHEET AND METHOD OF MAKING THE SAME
Filed June 29, 1935      2 Sheets-Sheet 1
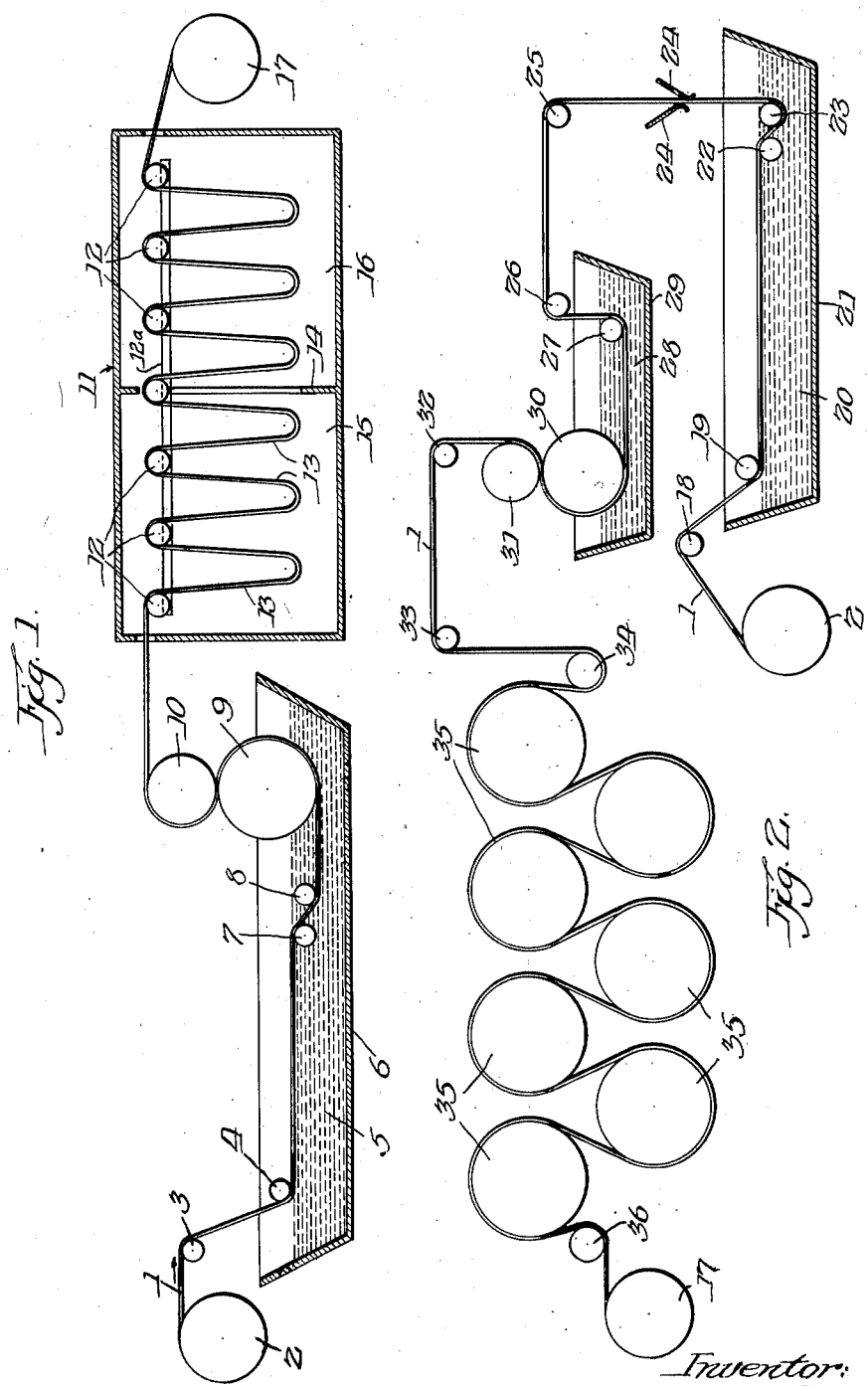
Inventor:
Richard Gurley Drew
By Paul Carpenter
Atty Jan. 7, 1941. R. G. DREW 2,227,444
ADHESIVE SHEET AND METHOD OF MAKING THE SAME
Filed June 29, 1935 2 Sheets-Sheet 2
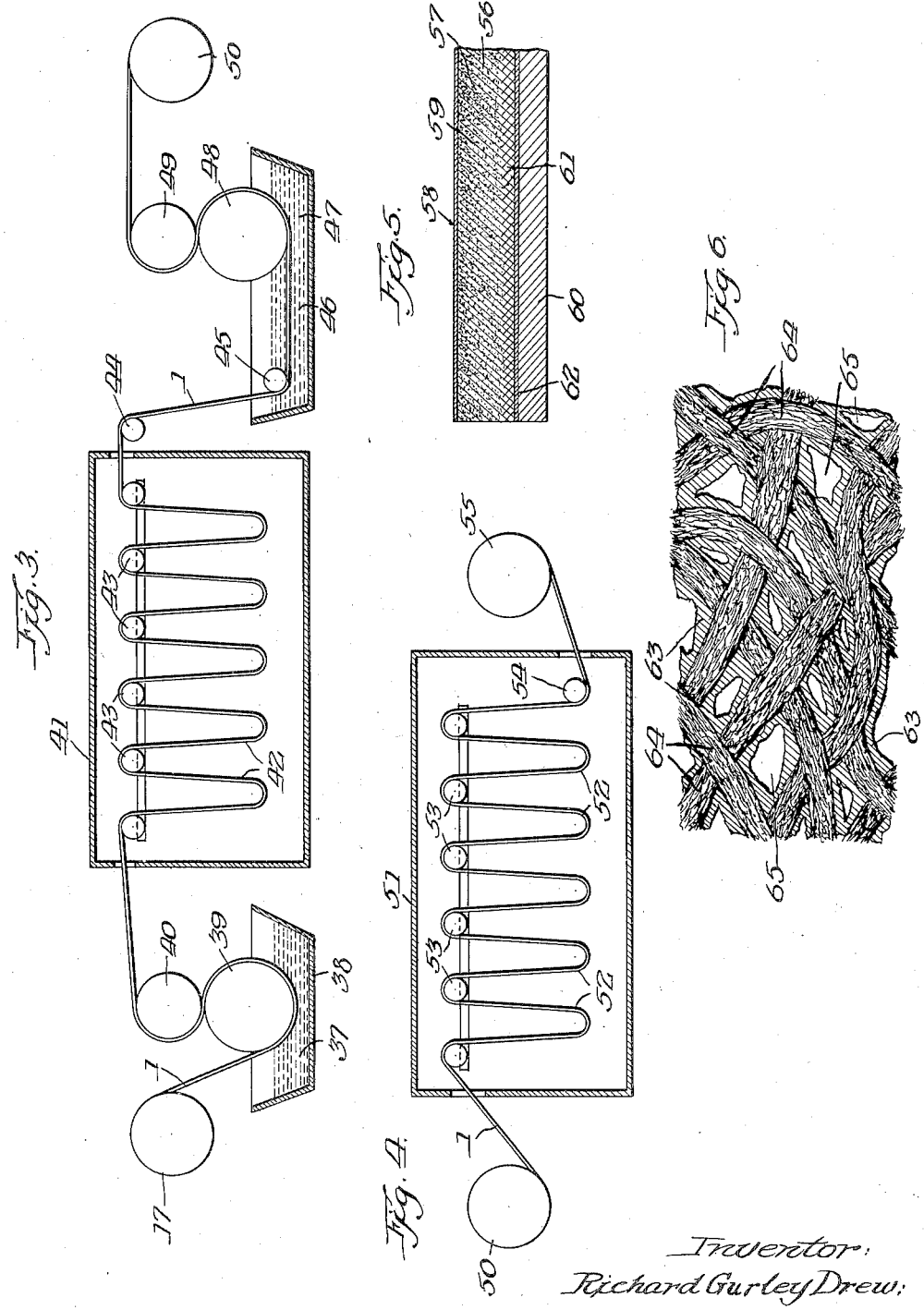
Inventor:
Richard Gurley Drew
By: Paul Carpenter
Atty Patented Jan. 7, 1941

2,227,444

UNITED STATES PATENT OFFICE 2,227,444

ADHESIVE SHEET AND METHOD OF MAKING THE SAME

Richard Gurley Drew, St. Paul, Minn., assignor to Minnesota Mining & Manufacturing Company, St. Paul, Minn., a corporation of Delaware Application June 29, 1935, Serial No. 29,122

9 Claims. (Cl. 91—68)

My invention relates in general to sheeted material, adhesives in the form of sheets, and methods of making the same; more particularly, to adhesive sheeting having a backing of a nonwoven or unspun material such, for example, as paper, to which may be applied a layer or coating of adhesive material which may be either pressure sensitive, that is, normally tacky, or solvent activatable.

In my prior application, Serial No. 281,104, which became Patent No. 1,760,820, and was reissued as No. 19,128, April 3, 1934, I have described and claimed certain adhesives, adhesive sheets and the like, and methods of making the same. The invention of said application has preferred utility in producing an adhesive article for limiting the application of spray of liquid finishing material, such as, for example, lacquers or painting materials used in operations in automobile paint jobs for masking during such operations or for holding masks in such painting operations.

The present invention is an improvement upon said application, including such other novel phases of the invention as may appear or be hereinafter pointed out.

While my prior application has the novel characteristics and utility pointed out therein, for the purpose of producing an adhesive article which in its specific embodiment involves using an unwoven or unspun backing material which may be cellulosic backing material such as paper, or for producing a strip of adhesive for use as a masking strip or for holding a mask in position, where it is used in certain automobile finishing operations, or for the production of an adhesive article in the form of rolls or stacked sheets, I have found that this material, particularly when prepared for use in localities having a wide range of atmospheric conditions, requires variation in preparation, among other things, to meet these various conditions due to different locality and seasonal change.

When backing material is made according to the processes set forth in my prior patent above mentioned and particularly when the backing material is unified with a glue base material modified by a hygroscopic flexibilizing agent such as glycerine, other polyhydric alcohols, such as ethylene glycol, or invert sugars such as glucose, it has been found, among other things, that due to varying humidity in varying localities and changes in weather there is a tendency under conditions of high atmospheric humidity for the backing to take on an excess of water, thus weakening the bond of the adhesive coating to the backing and causing the adhesive coating to offset onto the next adjacent layer in the roll. In order to prevent offsetting of the adhesive under conditions noted, or otherwise, as will be apparent, it has been found desirable to provide a backing having at least one face relatively porous so that adhesion is augmented by a positive mechanical interlock which is formed between the backing and the adhesive coating, or between the backing and an interposed treatment or coating, such as a primer coating, where such coating is used prior to coating with the adhesive. At the same time, it is necessary to unify the backing thoroughly by impregnation throughout its entire thickness in order, among other things, to prevent lamination of the backing and also that the desired flexibility may be maintained.

In unifying the backing material with a primary unifying agent, the use of flexibilizing agents to modify the unifying agent and retain the composite flexible introduces an element which renders the composite susceptible to extraneous conditions and extraneously applied materials. Referring to glue as the unifying agent and glycerine as the flexibilizing agent for purposes of exemplifying one preferred form of my invention, glycerine is essential to secure the desired flexibility of the glue in that the glycerine is hygroscopic or has the property of retaining moisture, keeping the glue and the paper fibres which it unites flexible.

While I refer to glue as an example of a unifying agent and glycerine as an example of a flexibilizing agent, it will be understood that these ingredients, in relation to the backing material, are purely illustrative and my invention contemplates, in its broader aspects, other unifying agents and flexibility augmenting agents for modifying the same and which latter agents may be responsive to atmospheric moisture or other extraneous agencies in so far as the atmospheric moisture or extraneous agencies may serve to vary the characteristics of the composite.

As stated, the use of glycerine as an element of the unifying impregnating solution is essential to the securing of the desired flexibility, in that the glycerine not only retains a moisture content which keeps the paper fibres flexible, but also the glycerine acts as a plasticizer for the glue, but it is the presence of glycerine which renders the material as previously made so susceptible to atmospheric conditions. Accordingly, in my preferred embodiment of my invention, it is desirable to regulate and minimize the amount of glycerine present in the completed adhesive tape and to so far as possible isolate the glycerine from atmospheric contact.

Many of the practical difficulties encountered by me in commercial use are overcome by the employment of a backing material disclosed and claimed in my co-pending application Serial No. 660,167; but the present invention goes farther in producing a backing material suitable for universal use and one which is substantially unaffected by changes in conditions of relative humidity and temperature in any locality.

One of the most important improvements of the present invention resides in the production of a backing material free from surplus unifying material on that side of the backing which receives the adhesive; resulting in more intimate association between the backing and adhesive; and increasing the effectiveness of a priming coat where such is used to assist in bonding the adhesive and the backing. The present invention also effects certain economies in production and distribution by eliminating the cost incident to varying the production and distribution to suit varying conditions of relatve humidity and temperature. Furthermore, this invention results in increased resistance to lamination of the backing. All the above advantages are secured without sacrificing desirable flexibility.

Therefore, the principal objects and advantages of my present invention, in addition to the improvements over the previous applications referred to, reside in the provision of an improved sheet material and method of forming the same, for employment as a backing for adhesive tapes, characterized by freedom from surplus unifying material on that side which receives the adhesive, the amount of unifying composition being limited so as to render that side relatively porous and thus afford better anchorage of the adhesive thereto; the provision of an improved backing material characterized by increased priming efficiency, that is to say, where primers are desired, the face side being relatively absorbent, more readily engages the primer; the provision of an improved backing material which is relatively porous on at least one face thereof, which facilitates the engagement of an adhesive therewith and with a unifying composition which might otherwise be incompatible with said adhesive; the provision of an improved backing and adhesive sheeting wherein resistance to lamination is markedly increased, due to the provision therein of a unifying composition which is relatively much stronger than any heretofore employed, but which does not materially detract from the flexibility of the finished product; and the provision of an improved adhesive sheeting in which the backing and adhesive and the composite formed by the two is relatively unaffected by conditions of relative humidity and temperature or changes in the same.

It is a further object of my invention to provide an adhesive article in the nature of a normally tacky but pressure sensitive adhesive tape employing, in its preferred form, a backing of unwoven and unspun material, such for example, as paper, or the like, in which the final article possesses the desirable qualities of my prior inventions, as particularly outlined in my applications Serial No. 660,167 and Serial No. 281,104, the latter being Patent No. 1,760,820, in that the backing material is unified, but at the same time, the desirable porosity of the face which receives the adhesive is maintained so that mechanical engagement in the nature of an interlacing of the adhesive, for example, a rubber base adhesive, takes place with the unifying composition of the backing, thus providing a unified article free from any tendency to split or laminate when used for its intended purpose or when formed into stacks or rolls, for marketing the same; to provide an article, in which the backing material used may be of unsized, bibulous, uncalendered and relatively porous paper of the type which may be previously toweled or creped; to provide an improved backing material in which a relatively porous paper is treated with a unifying composition and the backing after unification remains relatively porous on at least one surface thereof; the provision of an improved adhesive sheet wherein a mechanical engagement in the nature of an interlock is procured between the backing and the adhesive coating, while preserving the backing, where paper is used, unified.

It is a further object of my invention to provide an improved backing material and adhesive sheeting formed therefrom and a process for making the same wherein such factors as the desired relative humidity and temperature during the treatment may be more readily controlled to produce the desired result in the finished product; as well as the method as a whole for producing the article of this invention.

In the practice of the present invention, I prefer to treat cellulosic fibrous materials, such for example as a normally porous, bibulous or unsized variety of paper, for some purposes, employing such a paper, which has been previously formed with rugosities by creping or toweling.

I have discovered that in the treatment of an originally porous paper with a unifying solution of glue or glue and glycerine as examples of my preferred unifying composition, the nature of the resultant material may be greatly controlled by regulation of the temperature and humidity to which the material is subjected subsequent to saturation of the paper with the glue or glue-glycerine solution.

By saturation of the porous paper base with the glue or glue-glycerine solution, the glue solution fills the interstices between the fibers of the paper and in the practice as set forth in my previous invention, the glue was allowed to set up in a more or less solid or impervious mass thus binding the fibers together and securing the desired unification. If, however, the paper after saturation is immediately submitted to a relatively high temperature under the conditions as later set forth in detail the glue film between adjacent fibers will rupture and the glue will surround the individual fibers binding them to adjacent fibers only at points of intersection or contact and the resultant product can be made with any desired degree of porosity even to the point of closely approximating the porosity of the original paper.

The setting or jelling of the glue base unifying solution for a given grade of glue is dependent upon temperature on the one hand and upon the water content of the glue solution, on the other. Thus, if the water content is a constant, setting can be secured only by reduction in temperature, whereas if the temperature is a constant setting can be secured only by reduction of the water content.

When the glue is allowed to set at ordinary temperatures, such as 60 degrees to 80 degrees F. there is no rapid change in volume, due to loss of water content and a dense impervious sheet is formed in which the paper fibers are embedded in the film of the glue and drawn together as the film slowly shrinks due to loss of moisture. This is the process of my former applications.

On the other hand, I have found that when the water is removed at temperatures sufficient to keep the glue in a liquid state while water is being driven off, not only is the volume of the unifying solution reduced before any substantial set occurs in the film, but also more complete penetration of the glue into the paper fibers is secured, and accordingly, the glue impregnates and surrounds the individual fibers and these fibers are bound together by the glue at the points where they cross or touch each other, resulting in the desired porous sheet.

The grade of glue used is also an important factor in that the higher the gel strength of the glue, the higher must be the temperature maintained to prevent setting until the desired reduction in water content has been accomplished. Moreover, to allow the water to be driven out of the solution while at the same time maintaining the solid content of the solution in the desired plastic state, it is desirable that the water content of the atmosphere in which the process takes place be maintained at a relatively high point. In other words, by driving the water from the solution into the immediately adjacent atmosphere and maintaining the immediately adjacent atmosphere in a state of high humidity, I am able to reduce the water content of the solution to a point approaching equilibrium between the solution and the atmosphere without having the glue set or gel and without causing the glue to become brittle.

This relation can be most conveniently shown by the use of wet bulb temperature as compared to dry bulb temperature in which the relation is dependent upon humidity. That is, for a given dry bulb temperature and a given humidity there is a definite wet bulb temperature, and the sheet which is being dried assumes the wet bulb temperature so long as water is being removed therefrom.

For purposes of illustration, I have obtained results according to the following tabulation by treating a paper having an initial porosity of twelve seconds, with a glue solution consisting of 1 part 36 millipoise bone glue, 3 parts of glycerine and 6 parts of water. Porosity is measured by the standard readings of the Gurley densometer in which the readings represent the time required for 400 c. c. of air to pass through a one square inch area of a double thickness of the sheet. All temperatures are given in degrees Fahrenheit.

| Drying temperature | | Relative humidity | Porosity of unified sheet |
|---|---|---|---|
| Dry bulb | Wet bulb | | |
| °F. | °F. | Percent | Seconds |
| 120 | 92 | 35 | 19-24 |
| 143 | 92 | 15 | 14.5-19 |
| 84 | 70 | 50 | 166-240 |

It is, of course, understood that relative humidity is the ratio of the actual water content of the air to the maximum possible water content, at a given temperature, and thus 15% relative humidity at 143° F. means actual water content of 9.03 grains per cubic foot of air, and 50% relative humidity at 84° means actual water content of 6.23 grains per cubic foot of air. Thus, the lower relative humidity at the higher temperature represents a greater actual water content than the higher relative humidity at the lower temperature.

I have found that if initial drying is done at a temperature of 120° dry bulb, 92° wet bulb and 35% relative humidity, and final drying is done at 143° dry bulb, 92° wet bulb and 15% relative humidity the porosity of the resultant material is not changed from that where the drying was completed under the first conditions. This demonstrates that the wet bulb temperature is the controlling factor with respect to the porosity of the product, and that the higher dry bulb temperature in the final drying serves only to accelerate the process by increasing the rate at which the water content of the unifying solution is removed.

On the other hand, where there is an initial drying at high temperatures followed by final drying at normal temperatures, I have found that the porosity of the resulting sheet is in proportion to the extent to which the initial high temperature drying was carried.

Thus, using the same paper and glue solution as above, and subjecting the paper to initial temperature of 143° dry bulb, 92° wet bulb and 15% relative humidity for nine minutes and then completing the drying at 84° dry bulb, 70° wet bulb and 50% relative humidity, the resultant article has a porosity of 40 to 96 seconds. When the initial drying was reduced to six minutes, the porosity was 64 to 116 seconds, when the initial drying was reduced to three minutes, the porosity was 122-128 seconds and when there was no initial drying but all the drying done at the lower temperatures, the porosity was 166-240 seconds. Comparison with the results shown above, of porosity of 14.5-19 seconds for complete drying at the high temperature clearly shows the increased porosity effect produced by the use of high temperature in the drying, particularly in the initial stages, while maintaining a wet bulb temperature sufficiently high to keep the glue from setting until a considerable portion of the water content has been driven out.

The backing resulting from the above treatment can thus be made of any desired degree of porosity and is somewhat thicker than the original paper in that this treatment results in a "puffing" of the paper due to what I believe to be a result of surrounding of each individual fiber with a film of the glue or glycerine, rather than a continuous film of the glue with the fibres dispersed therethrough.

As a second step in this treatment, one side only of the backing is subjected to a second impregnation of a sizing solution which may conveniently be a straight glue solution. This is preferably applied so that it seals only the back side of the backing and barely penetrates to the opposite face or that portion of the final backing which is to receive the adhesive. The backing thus treated is then subjected to another drying action under controlled conditions of temperature by which any desired degree of porosity can be secured in the same way as above indicated for the first impregnation. The backing as thus treated is then passed through a formaldehyde bath in order to render the glue content water insoluble by the tanning action of the formaldehyde. After this tanning action is completed the backing is subjected to a final drying to drive off the water of the formaldehyde solution, after which the backing is ready for application of the adhesive.

The process as above outlined can best be set forth in detail in connection with a convenient apparatus by which it may be carried out as shown in the drawings, in which:

Figures 1 and 2 are schematic representations of alternative methods of carrying out first step of the unification of the porous backing material;

Figure 3 is a schematic representation of the step of applying the backsizing and of the formaldehyde step;

Figure 4 is a schematic representation of the final drying step;

Figure 5 is a representation of a sectional view of an adhesive coated sheet according to this invention;

Figure 6 is an enlarged view of a surface of the material showing the porous structure attained by this process.

Referring now to Figure 1 of the drawings, a web of material 1, which is an unsized porous paper, is fed from a roll 2 of such material in the direction indicated by the arrow, and passed over guide roller 3, under guide roller 4 at which point the under side of the paper is brought into contact with the surface of a unifying solution 5 of glue or glue and glycerine contained in a tank 6. The web then passes over roller 7 which together with roller 4 is so positioned as to cause the web to float on the surface of the unifying solution between these rollers and the space between the rollers, and the rate of movement of the web is such that the solution is taken up by the web from one side only during this first stage, which results in the driving out of the air in the material. The web then passes under roller 8 which carries it beneath the surface of the solution to complete the saturation of the upper side of the web. The web is then passed between squeeze rolls 9 and 10 which are adjustable and afford a means of controlling the amount of the unifying solution to be taken up by the paper. The web then passes into the drying oven 11 where it is passed over supports 12 to form festoons 13 and is subjected to the controlled drying conditions of temperature and humidity above described. The supports 12 are removably mounted upon a track indicated at 12a and means not shown are provided to cause these supports to move lengthwise of the oven from left to right in the schematic showing thus carrying the web through the oven.

While this drying process is a single operation yet in practice I have found that by dividing this oven by a partition 14 into two portions 15 and 16, I am able to better control the relative humidity during the early stages of drying at the relatively high temperatures used. In the oven 11 the temperature and relative humidity are so controlled as to give the desired porosity to the web impregnated by the glue or glue glycerine solution.

Upon emerging from the oven 11 the web is taken up on a roll 17.

An alternative device for performing this initial impregnation of the web is shown in Figure 2 where the web 1 from the roll 2 is passed over roll 18 and under roll 19 to float on the surface of solution 20 in tank 21 to roll 22, beyond which the web is given a quick dip by roll 23 and passed between scrapers 24 to remove excess solution, then over guide rolls 25 and 26 and submerged in solution 28 in tank 29 and passed between adjustable squeeze rolls 30 and 31. The solutions 20 and 28 are the same glue or glue glycerine solution as solution 5 in Figure 1 and these methods differ only in the steps taken to insure complete saturation of the web.

The web then passes around guide rolls 32, 33 and 34 and over a series of drying rolls 35 which are hollow cylinders containing steam and by which any desired temperature within the requirements of this process can be obtained by regulation of the steam pressure. The drying rolls 35 constitute what is known in the art as "can drying," and by regulation of the temperature in the successive rolls and control of room humidity as the water is driven off from the web the desired wet bulb temperature, which is the temperature of the web, can be maintained.

Upon leaving the rolls 35, the web is wound upon the roll 17.

It will be understood that Figures 1 and 2 represent various embodiments for accomplishing the same result and that either means of saturating the web may be used with either means of drying the web.

In any case the web when formed into rolls 17 represents the porous paper impregnated with a glue or glue glycerine solution and dried under controlled conditions of temperature and humidity to give a unified web of the desired degree of porosity.

Considering now the second step as shown in Figure 3, the web 1 is taken from the roll 17 and passed under roll 39 which is so positioned as to expose one surface only of the web to the glue sizing solution 37 in the tank 38. The web is then passed between squeeze rolls 39 and 50 which are adjustable in relation to each other to control the pressure. Thus by regulation of the rate of travel of the web and the squeeze rolls 39 and 40, the amount of the sizing solution taken up can be accurately regulated and is preferably such that the exposed face is saturated, but the solution barely penetrates to the unexposed face. The degree of penetration of the sizing solution may be still further controlled by controlling the viscosity of the sizing solution. The web then passes into oven 41 where it is festooned in loops 42 over supports 43 and subjected to drying at controlled temperatures. When this drying step is carried out at 70° to 85° the sizing coat will set as an impervious coating and the resultant backing material will then be porous on one side only. However, if desired, this drying may be done at higher temperatures, as is done in the first drying, so that the back side may be of any desired porosity up to substantially that of the face side.

From the oven 41 the web passes over roll 44 and is immersed in a formaldehyde solution 46 in a tank 47 by passing under rollers 45 and 48. The solution 46 is conveniently 1 part of commercial formaldehyde to 9 parts of water, although other proportions may be used. The web then passes between squeeze rollers 48 and 49 which are adjustable for controlling the amount of formaldehyde solution to be taken up and then formed in roll 50 in a wet state. The web is allowed to remain in roll 50 for about three hours to allow the formaldehyde to act upon the glue as a tanning or insolubilizing agent which renders the glue insoluble in water.

After sufficient time has elapsed to allow the action of the formaldehyde the web 1 is taken from the roll 50 and festooned as at 52 over supports 53 in oven 51 where it is subjected to heating to drive off the water and all surplus formaldehyde. It is then removed under guide roller 54 and formed into roll 55.

At this stage the treatment of the backing itself is complete and the web now consists of a unified sheet having one side which is designated as the face side of substantially the same porosity as the web which was taken from oven 11 and formed into roll 17. However, the other side designated as the back side has been sized by the glue solution 37 and has a porosity ranging from that of the face side to a practically impervious surface depending on the heat treatment given in oven 41. Furthermore all of the glue in the web has been rendered resistant to moisture by the formaldehyde treatment. This backing material is subsequently coated on the face side thereof with a pressure sensitive adhesive, conveniently a rubber base adhesive as disclosed in my previous application, and the porous nature of the face side allows the adhesive material to penetrate the backing and secure a mechanical interlock therewith. For certain purposes it may be desirable to use a priming coat on the face side prior to the application of the adhesive and in this case the priming coat enters the pores of the backing to secure the mechanical interlock and in turn provides a compatible base for the adhesive coating.

Referring to Figure 5, I have illustrated a cross sectional view of an adhesive sheet having backing material made as above described. The backing material is shown at 56 and the uniform impregnation or unification resulting from the first step is shown by the uniform cross hatching lines 57. The back sizing or second step is indicated by the film 58 on the back of the material and the degree of saturation decreasing from the back side to the face side is indicated by the stippling 59. The adhesive coating is represented at 60 and the penetration of this coating into the backing by the extended cross hatching as at 61. The priming coat 62 is optional but when used would penetrate the backing in the same way as the adhesive coating.

Referring to Figure 6, I have here represented an enlarged view of a surface or longitudinal section of the backing material in which the individual fibers 64 are shown as surrounded by the glue film 63 which has been ruptured to form the porous structure as shown at 65 by the controlled heat treatment above described.

While this process is subject to wide variation with respect to the proportion of ingredients used in the various solutions the following formulas have been found to give satisfactory results and are given for purposes of illustration:

In the first step of impregnation, a solution of the 1 part of glue, 3 parts of glycerine and 6 parts of water may be used. The proportions are by weight with reference to the weight of dry glue. In order to insure thorough impregnation of the entire sheet, care is taken to assure complete initial saturation as noted above. However, due to the desired porous quality of the product after this first step and the more efficient distribution of the glue resulting from this process, I have found that complete saturation is not necessary and the web weight of the paper is controlled by squeeze rolls 9 and 10 in Figure 1, and 30 and 31 in Figure 2. Thus, using a paper having a dry weight of 15 grains for an area 4" x 6", I have found that good results are obtained by regulating the web weight as it comes from the rolls to a total of 42 grains. This means that 27 grains of solution is taken up comprising 2.7 grains of glue, 8.1 grains of glycerine and 16.2 grains of water.

In the second step of impregnation which constitutes the backsizing, I conveniently use a solution of 1 part of glue to 3 parts of water based on the dry weight of the glue, and the rolls 39 and 40 in Figure 3 are regulated to limit the solution taken up to 8 grains to the 4" x 6" area, comprising 2 grains of glue and 6 of water.

Thus, in these two steps the total solid content with which the paper is impregnated is 12.8 grains per 4" x 6" area comprising 4.7 grains of glue and 8.1 grains of glycerine or a ratio of glycerine to glue of 1.72 to 1. Comparing this to the process in my prior application, it will be seen that in the latter the ratio of glue to glycerine was 3 to 1 and that by the present process I have greately reduced the glycerine ratio and consequently reduced the tendency of the backing to be affected by atmospheric humidity. Furthermore, the backsizing in the second step tends to isolate the glycerine content of the first step by surrounding the original glue glycerine imprenation.

Furthermore, the control of the amount of impregnation to a point below saturation, particularly in the first step results in what may be termed "partial starvation" which is maintained on the face destined to receive the adhesive through control of the backsizing step resulting in a surface receptive to the application of adhesive or primer as the case may be.

Because of the more efficient use of the unifying material and because of the porous structure secured no sacrifice in resistance to lamination or flexibility of the final sheet results from this process.

While the backing material resulting from this process may be used with any adhesive, because of the mechanical interlock provided by the porous face of the backing, I prefer to use the rubber base adhesives described in my Patent No. 1,760,820, now Reissue No. 19,128, either with or without the use of the priming solution also described therein. These adhesives or primers are applied in a fluid condition and readily enter the porous face of the backing material to secure the desired interlocking structure and being themselves unified, that is, having a greater integral adhesion than adhesion to a surface to which the adhesive tape may be later applied, there is no tendency for the adhesive coating to offset either to the backing of an adjacent strip when formed in stacks or rolls, or to the surface to which the tape is applied in use, and this integral adhesion between the backing with or without the priming coat and the adhesive, persists under varying atmospheric conditions or other extraneous agencies tending to effect the product during storage or that involved in actual use of the product.

In the claims, where I have referred to a "unified" backing or a backing treated with a "unifying" material, I mean to include a web of fabric, preferably paper or fibrous unwoven sheets, in which the constituents of the sheet are integrated, protected and held together against separation and with greater adhesion inter se than an applied adhesive which it carries has for the material to which the adhesive coating is affixed, to permit removal of the sheet from the work to which it is applied or from rolls or stacks of such sheets without substantial splitting or lamination of the sheet in the absence of extraneous agencies such as abnormal atmospheric conditions or other extraneously involved agencies.

Having thus described my invention and illustrated its use, what I claim as new and desire to secure by Letters Patent, is—

1. A backing material for the purposes described comprising a relatively porous cellulosic sheet of fibrous material impregnated with a glue base material unifying the fibres, presenting a porous texture in one face thereof and a sealing coat on the opposite face thereof.

2. A composite sheet comprising a relatively porous fibrous cellulosic material impregnated with a protein base material modified by a flexibilizing agent, unifying the fibrous material, the impregnating material being porous in at least one face of the sheet and a coating anchored in the porous texture so presented, the other face of said backing being sealed by a coating.

3. A composite sheet comprising a relatively porous fibrous cellulosic backing material impregnated to unification with a glue-glycerine composition of porous texture in at least one face thereof, a rubber base coating applied to said last mentioned face anchored in the porous texture, the other face of the backing being substantially sealed.

4. A composite sheet comprising a relatively porous fibrous cellulosic backing material impregnated to unification with a glue-glycerine composition of porous texture in at least one face thereof, a water insoluble coating applied to said last mentioned face anchored in the porous texture, the other face of the backing being substantially sealed.

5. The process of treating relatively porous fibrous backing material which comprises applying an impregnation of a protein base material in quantity sufficient to unify the fibrous material, the impregnating material being applied in an unset condition and "set" under conditions rendering a substantial portion adjacent one face of the backing in a porous condition.

6. The process of treating a relatively porous fibrous sheet which includes as steps thereof applying an impregnating solution of a glue base material in quantity sufficient to unify the fibrous material and separating the vehicle while maintaining the glue in a liquid state at temperatures above the "setting" of the glue to the end point resulting in a porous condition of the glue, resulting in a porous texture of the composite.

7. The process of producing a unified porous backing material which comprises the steps of impregnating a sheet of porous cellulosic material with a normally solid unifying material in solution with a liquid vehicle and removing said vehicle while maintaining the unifying material in a liquid state.

8. The process of treating a relatively porous sheet of paper with a binding agent which includes the steps of impregnating the sheet with a normally solid unifying material in solution with a liquid vehicle and curing the impregnated sheet under conditions of humidity and temperature to remove said vehicle while maintaining the binding agent in a liquid state, to the end that the resulting sheet is maintained porous on at least one surface thereof to a degree sufficient to permit penetration thereof and anchorage thereto of coatings of plastic masses.

9. The process of treating a sheet of relatively porous paper with a binding agent comprising a proteinous base material in an aqueous vehicle, and modified by a hygroscopic flexibilizing material, the quantity of the proteinous base material being sufficient to unify the fibres of said sheet, the steps which comprise initially impregnating the sheet with the binding material, the hygroscopic flexibilizing material and aqueous vehicle, then curing the impregnated sheet to remove the aqueous vehicle under conditions of temperature and humidity maintaining the binding agent in an unset condition, the temperature and humidity conditions being maintained above those causing setting of the binder to the end point resulting in a porous condition of the sheet, impregnating the sheet on at least one face thereof with a solution of said binding agent, substantially free from said hygroscopic flexibilizing agent, curing said sheet and rendering said binding material substantially water insoluble by treatment with an insolubilizing agent for said binding agent, whereby said hygroscopic flexibilizing agent is substantially isolated and the finally impregnated sheet is rendered resistant to moisture.

RICHARD GURLEY DREW.